United States Patent [19]

Chen

[11] 4,422,498
[45] Dec. 27, 1983

[54] MACHINE TOOL COOLING SYSTEM

[75] Inventor: Po-Shiun Chen, Taichung Hsuan, Taiwan

[73] Assignee: YCI USA, Inc., Compton, Calif.

[21] Appl. No.: 299,834

[22] Filed: Sep. 8, 1981

[51] Int. Cl.³ .............................................. F16H 7/02
[52] U.S. Cl. ........................................ 165/47; 474/93
[58] Field of Search ...................... 165/32, 47; 474/93

[56] References Cited

U.S. PATENT DOCUMENTS

| | | | |
|---|---|---|---|
| 1,512,546 | 8/1924 | Kimble | 474/93 |
| 2,145,545 | 1/1939 | Johnson et al. | 474/93 |
| 2,205,975 | 6/1940 | Heyer | 474/93 |
| 2,966,068 | 12/1960 | Christian | 474/93 |
| 3,005,357 | 8/1961 | Christian | 474/93 |
| 3,467,177 | 9/1969 | Hoddinott | 165/47 |
| 4,078,602 | 3/1978 | Richer | 165/32 |
| 4,342,359 | 8/1982 | Baker | 165/47 |

FOREIGN PATENT DOCUMENTS 996056 6/1965 United Kingdom .................. 165/32

Primary Examiner—William R. Cline
Assistant Examiner—John M. Kramer
Attorney, Agent, or Firm—Fulwider, Patton, Rieber, Lee & Utecht

[57] ABSTRACT

A cooling system for a machine tool utilizing an independently operated fan. The machine tool power transmission housing mounts the fan to draw the cool, ambient air through the housing in a heat exchange relationship with the heat generating elements of the power transmission means. The fan is automatically operated by means of a temperature monitoring switch mounted on the power transmission housing. The drive motor housing is independent of the power transmission housing and is constructed and defined to permit the motor to draw in the cool ambient air in a heat exchange relationship with the motor when it is operative and to expel the hot air therefrom.

2 Claims, 4 Drawing Figures

MACHINE TOOL COOLING SYSTEM

FIELD OF INVENTION

This invention relates to a cooling system for a machine tool and, more particularly, to a cooling system for the heat generating elements of the machine tool, such as a milling machine or the like.

BACKGROUND OF THE INVENTION

The present invention is an improvement over the cooling system for machine tools of the type disclosed in U.S. Pat. No. 3,467,177. The cooling system disclosed in U.S. Pat. No. 3,467,177 discloses a cooling fan integrated into the main drive motor for the machine tool head in the form of a milling machine. In this arrangement the air path for the cooling air is defined to cause the ambient cooling air to be drawn into the machine and to travel in close association with the heat generating power transmission elements and the drive motor associated therewith. In traversing this relatively long path the cooling air also travels alongside the drive motor prior to the heated air being exhausted to the atmosphere. Because of the long air flow path the overall cooling effect of the air is reduced. The effectiveness of the cooling air is dependent also on the speed of the drive motor. If the spindle of such a machine tool is operated approximately thirty minutes at 3,000 R.P.M. the increase in temperature of the housing will be 27° Centigrade, if an ambient temperatue of 18° Centigrade is subtracted therefrom. The ability of such a prior art system to cool the heat generating elements of a machine tool will vary if a variable speed drive motor is utilized and the drive speeds are changed. At the lower drive speeds the cooling ability of this prior art technique may be inadequate. Accordingly, there is a need at the present time for an improved cooling system for machine tools having heat generating elements therein when operating on a workpiece.

SUMMARY OF THE INVENTION

The present invention provides an improved cooling system for a machine tool of the type of a milling machine. The cooling system is integrated into the machine tool by means of an independently driven cooling fan that increases the cooling of the machine tool on the order of 25% greater. The cooling system for the power transmitting means of the machine tool is independent of the machine tool drive motor and the air path for cooling the spindle and the transmission means is independent of any drive motor housing. The drive motor is isolated within a separate chamber from the power transmission means for cooling purposes and is provided with means to draw the cool ambient air within one end of the shell housing the motor and expelling it at a point remote therefrom after it has passed in heat exhange relationship with the drive motor. The heated cooling air is discharged from the machine tool at a point spaced from the machine operator's head so as not to interfere with his operation of the machine. Increased cooling capabilities afforded by the present invention prevent abnormal rises of temperature while the spindle of the machine is running at high speeds, and thereby prevents breakdown of the machine, leading to extended useful life thereof. The cooling system also causes the machine to be more accurate for a longer period of time, due to the improved cooling.

From a structural standpoint, the present invention provides a combination motor and power transmission unit for a machine tool, or the like. The energizable electrical drive motor is encased within a shell forming a chamber solely containing the drive motor with the motor drive shaft extending outwardly therefrom. The power transmission means is coupled to the portion of the motor drive shaft extending outside of the shell to be driven thereby when the motor is energized. A rotatable machine tool spindle is coupled to the power transmission means to be rotatably driven thereby in response to the energization of the electrical drive motor. A housing forming a chamber is provided for containing the power transmission means and with the machine tool spindle extending outwardly therefrom. The housing chamber is independent of the shell for the drive motor. The housing includes an opening remote from the spindle and adjacent one end of the power transmission means. An independently operated fan is mounted in the housing opening and is operable between a fan running and nonrunning position. The power transmission housing further includes air inlet means constructed and defined on the opposite end of the housing from the fan to cause the ambient air to be drawn into the housing by means of the inlet means when the fan is operated to a running position and exhausted from the housing thereby. The arrangement includes means for automatically operating the fan to a running position from its normal nonrunning position. The energization of the drive motor causes the rotation of the spindle through the power transmission means and thereby generating heat in the power transmission means, the spindle, and the drive motor and associated elements and the air surrounding the elements in the housing whereupon the operation of the fan operating means to a fan running condition will cause the generated heat to be transferred to the cool air entering the housing and to be exhausted through the fan to thereby cool the heated elements.

In one particular embodiment of the invention the means for operating the fan may include temperature monitoring means mounted on the outside of the housing for sensing the temperature thereof to operate the fan to a running position on sensing a preselected temperature. The arrangement may further include means for cooling the electrical drive motor that comprises impelling means mounted to the end of the drive shaft of the drive motor so that the air will be drawn into the shell and expelled at a point remote therefrom upon energization of the drive motor. In this fashion both the power transmission means and the drive motor can be independently cooled and both cooling arrangements providing for increased efficiency of the machine tool.

These and other features of the present invention may be more fully appreciated when considered in light of the following specifications and drawings, in which:

DETAILED DESCRIPTION

Figure 1:
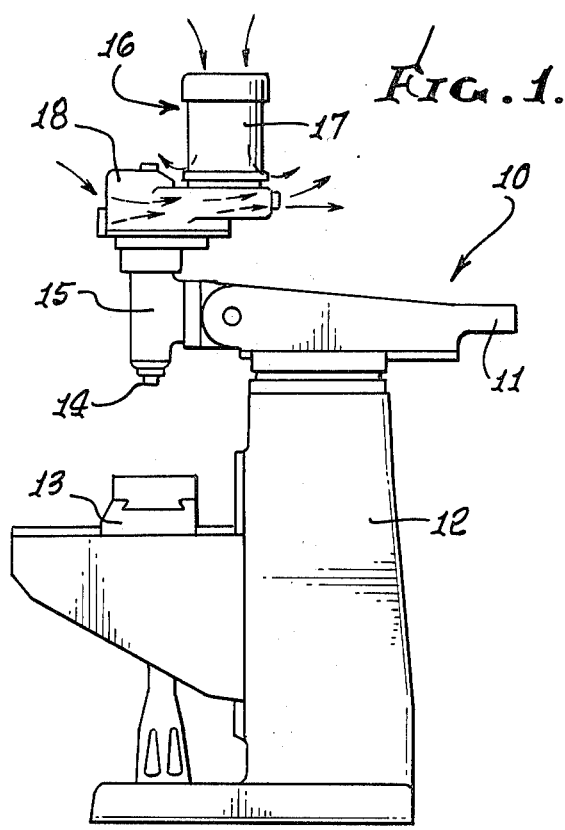
FIG. 1 is a side elevational view of a machine tool of the type of a milling machine and embodying the present invention wherein the path of the cooling air for cooling the power transmission means and the drive motor are indicated by the flow of the arrows.
Figure 2:
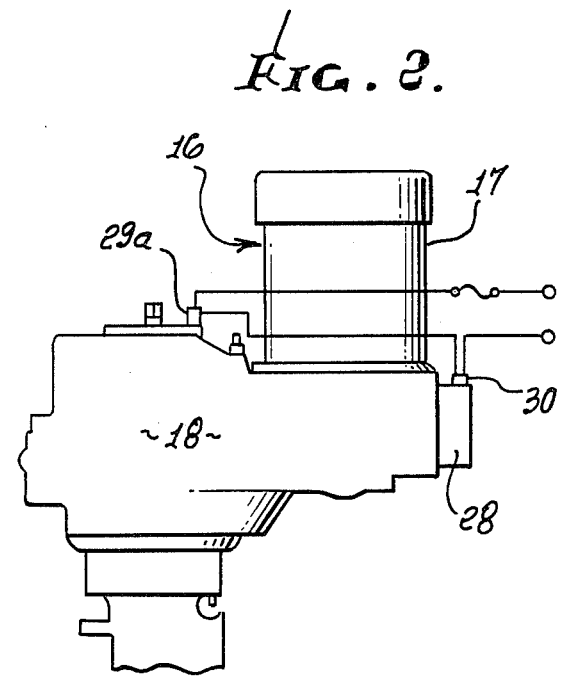
FIG. 2 is a simplified view of the electrical control circuit utilized with the temperature monitoring means for operating the cooling fan illustrated in FIG. 1.
Figure 4:
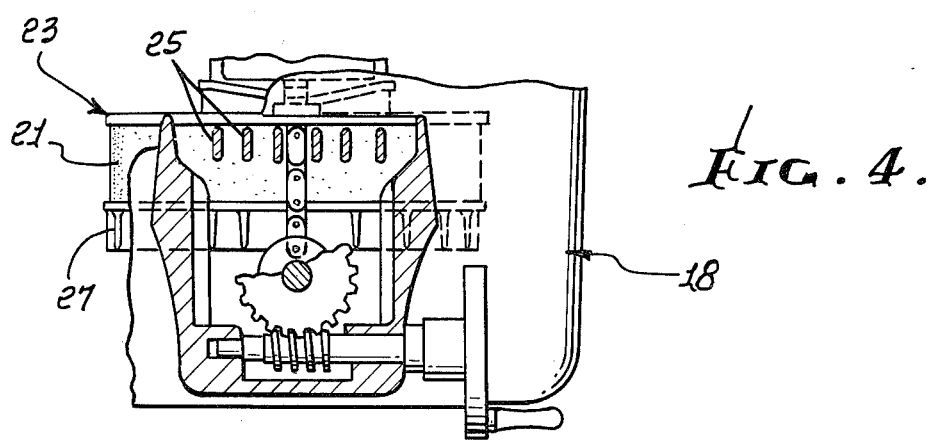
FIG. 4 is a cross sectional view taken along the line 4—4 of FIG. 3.
Figure 3:
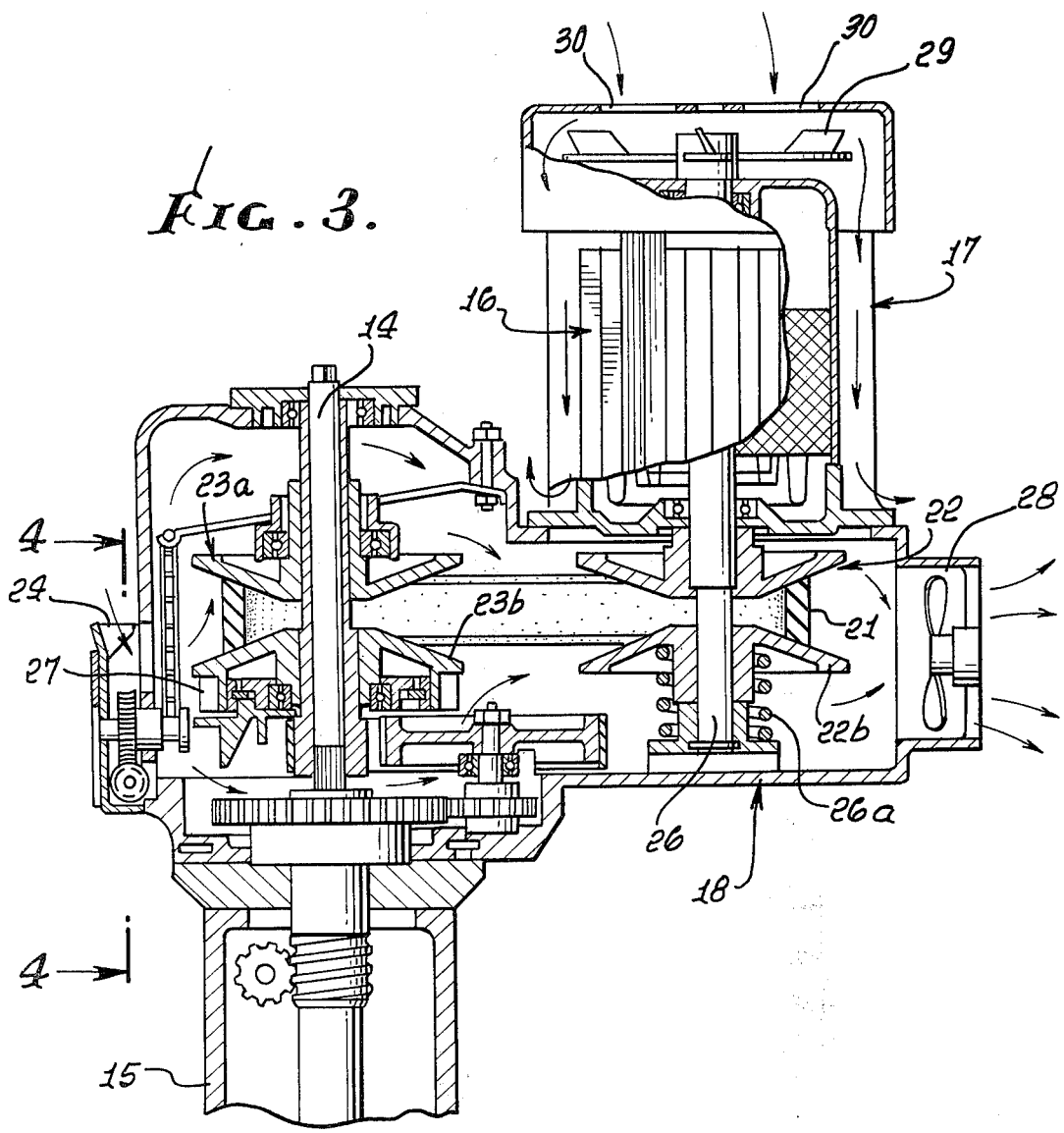
FIG. 3 is a cross sectional view through the power transmission housing and motor housing illustrating the flow paths of the cooling air through each of the housings.

Now referring to the drawings, the detailed description of the cooling system for the machine tool 10 will be described. The drawings illustrate a machine tool 10 in the form of a machine that can be used for milling, drilling, boring, etc. It is specifically of the type illustrated and described in U.S. Pat. No. 3,467,177 and which description is incorporated herein by reference. The machine tool 10 is illustrated in FIG. 1 as comprising an overarm 11 supported on a standard 12 equipped with an adjustable work feeding table 13. The machine tool 10 includes a suitable machining tool such as a drill, milling cutter, boring tool, or the like (not shown), held and driven by a vertical spindle 14 that depends from its quill housing 15. In machines of this type power is usually derived from an electric motor 16 mounted in a housing 17. The housing 17 is constructed and defined to be independent of a housing for the power transmission means coupled between the drive motor 16 and the spindle 14. The power transmission housing is identified by the reference numeral 18. The quill housing 15 depends from the housing 18. The power transmission means comprises a speed reducing, power transmitting mechanism including a belt 21 trained about a drive pulley 22 of the expandable V-groove type, and a driven pulley 23 having a V-groove of selectively variable width. The drive belt 21, the pulleys 22 and 23 and other associated parts of the transmission means are illustrated in FIG. 3 to occupy a chamber defined within the housing 18. An inlet for the housing 18 for the cool ambient air to enter inside the housing 18 is provided by a detachable louver 24 affording an intake port for cooling air and protecting against the accidental insertion of foreign objects by means of well spaced-apart cantilevered fins 25. The louver 24 covers a sizable opening in the front wall of the housing 18 except for the air admitting openings between the fins 25.

The speed ratio of driving parts to driven parts is variable on the stepless shift principle by making the pulleys 22 and 23 of the variable groove type. For this purpose the bottom part 22b of the drive pulley 22 is keyed slidably to the motor shaft 26 and is constantly thrust towards pulley part 22b by an axially tensioned spring 26a, whereby to drive the belt 21 by sequeezing it in the variable width of the V-groove that results. Both spreadable parts 23a and 23b of the pulley 23 are keyed to the shaft 14. The pulley part 23b is provided with fan vanes 27 to assist in maintaining the flow of cooling air. The arrangement is such that the gears act to reduce the speed derived from the drive motor shaft 26 as they transmit the power from the drive motor shaft to the turnable tool spindle 14 of the machine tool 10. In transmitting power as described, heat is generated due to the friction generated by the power transmitting means.

The housing 18 is defined with an opening at a point remote from the inlet for the cooling air, or, in the right hand end thereof as illustrated in FIG. 3. An independently operated cooling fan 28 is mounted in the opening to cause air to be drawn within the housing 18 at the inlet end to travel in a path from the inlet in a heat exchange relationship with the drive pulleys and drive belts to be expelled from the cooling fan 28 to the atmosphere; see FIGS. 1 and 3. This cooling action will result in the lowering of the temperature of the spindle 14. The cooling fan 28 is a commercially available muffin fan. In this respect it should be noted that the air path through the housing 18 is completely independent of the housing 17 for the drive motor 16 and that the cooling air is not subjected to the heat generated by the drive motor 16, but is completely independent thereof. The drive motor 16 has the upper end of its drive shaft 26 equipped with an axially extending impelling means 29 which when operated cause the ambient air to be drawn within the motor housing 17 by means of the apertures 30 in heat exchange relationship therewith to cause the cool ambient air to cool the drive motor 16 when it is in operation; see FIG. 1 and 3. The air is caused to be expelled at a point remote from the impelling means 29, or, at a point separated from but adjacent to the point of expelling the hot air by means of the fan 28. It will be recognized that there is no communication between the air cooling path for the air for the motor 16 and the housing 18.

In accordance with the concept of the present invention the cooling fan 28 is also provided with a temperature monitoring switch 29a which is fixed on the top of the housing 18. The temperature monitoring switch 29a is connected to an alternating current power source in series circuit relationship with the on/off switch 30 for the fan 28 to cause the fan to be switched to a running cooling position when the temperature monitoring switch 29a reaches a preselected temperature. Accordingly, the fan 28 will be normally in a nonoperative condition until the temperature monitoring switch 29a senses the preselected temperature and then automatically switches it to a fan running condition to cool the elements within the housing 18.

The operation of the machine tool 10 and the cooling fan now should be appreciated. While the spindle 14 is rotating during operation of the machine tool, the temperature of the spindle, which is driven from the drive motor 16, begins to rise because of the friction that is generated between the driving parts including the power transmission means. When the temperature reaches a preselected temperature and is sensed by the switch 29a, the cooling fan 28 is switched to an operative, running position for cooling the power transmission mechanisms within the housing 18. During the intervals that the machine tool 10 is operative as a result of the energization of the motor 16, ambient air will be drawn into the motor housing 17 for cooling and minimizing the transmission of any heat from the motor shaft 26 to power transmission mechanisms within the housing 18. In a practical test of the cooling system of the present invention the machine tool 10 was run for approximately eight hours straight without interruption and the final temperature reached at the housing 18 was approximately 18 degrees Centigrade, or approximately 62 degrees Fahrenheit. When the prior art type of machine as exemplified by the cooling system disclosed in U.S. Pat. No. 3,467,177 was operated for the same length of time the temperature was determined to be 24 degrees Centigrade, or approximately 75 degrees Fahrenheit. The improved cooling action afforded by the cooling system of the present invention is attributed to the shorter air flow path through the transmission mechanism and the use of an independently driven cooling fan. In addition, the cooling capacity is not related to the speed of the drive motor 16, which may be variable. The use of the temperature monitoring switch 29 on top of the housing 18 automatically signals the operation of the fan 28 to an operative running position for cooling purposes.

In further comparison tests on the machine tool 10, the machine tool was operated with a standard electrical motor (without integral cooling means) and a motor with cooling means as described hereinabove. The results of operating the spindle 14 for thirty minutes at 3000 and 1500 R.P.M. and the resulting temperature in degrees Centigrade are noted in the table below.

| | | Conditions | | | |
|---|---|---|---|---|---|
| | | VENTILATION | | NON-VENTILATION | |
| | | Rise of temperature | | | |
| Speed of Spindle 14 | Measurement Position | Standard Motor | Motor With Fins | Standard Motor | Motor With Fins |
| 3000 R.P.M. | Spindle 14 | 9° C. | 2° C. | 10° C. | 5° C. |
| | Housing 18 | 19 | 11 | 27 | 19 |
| 1500 R.P.M. | Spindle 14 | 8 | 2 | 8 | 3 |
| | Housing 18 | 13 | 5 | 24 | 16 |

Note: The above data is the result of subtracting the temperature measurement from the room temperature of 18 degrees Centigrade or the increases in temperature

I claim:

1. In a machine tool of the type including a vertical spindle coupled with a rotary tool and mounting a driven V-pulley, a spindle drive motor including a drive shaft projecting parallel to said spindle and mounting a drive V-pulley aligned with said driven V-pulley, a drive belt trained over said pulleys and a housing housing said motor, shaft, spindle and V-pulleys, the improvement comprising:

a first housing section housing said spindle drive motor and formed with a motor air cooling passage leading from a first inlet to define a downwardly directed heat exchange passage for directing air in heat exchange relationship with said motor and then terminating in a first outlet spaced downwardly from said first inlet;

a second discrete housing section housing said V-pulleys and drive belt and forming a discrete horizontally elongated substantially straight passage leading from a second inlet disposed on one side of said driven pulley to a second outlet disposed on the side of said drive pulley opposite said one side to define a straight power transmission air cooling passage for directing air from said second inlet in direct heat exchange relationship with said driven pulley, drive belt, drive pulley and directly out said second outlet;

impeller means in said first housing section and coupled with said motor drive shaft to draw cooling air in said first inlet to flow in heat exhange relationship with said motor to be exhausted out said first outlet;

a fan mounted on said second housing section for drawing air out said second outlet to create a negative pressure at said second outlet to positively draw cooling air in said second inlet to flow over said driven pulley, along the length of said drive belt, over said drive pulley to exhaust directly out said second outlet;

a fan drive motor mounted on said second housing and coupled with said fan to drive said fan at a speed independent of said spindle drive motor speed; and control means connected with said fan drive motor for controlling said fan drive motor whereby operation of said spindle drive motor will draw ambient air in said first inlet to direct it downwardly through said motor and cooling passage, over said motor and out said first outlet and said fan drive motor may be operated independently of said spindle drive motor to draw air in said second inlet and longitudinally along said elongated straight passage over said drive pulley, over the length of said drive belt and over said drive pulley to then exhaust out said second outlet without passing through said first inlet, first passage and first outlet.

2. The machine tool of claim 1 wherein:
   said control means includes a temperature responsive switch responsive to a predetermined temperature to actuate said control means.

* * * * *